(12) United States Patent
Kaspersky et al.

(10) Patent No.: US 11,259,179 B2
(45) Date of Patent: *Feb. 22, 2022

(54) SYSTEMS AND METHODS FOR ENABLING TRANSMISSION OF DATA AND COMMANDS BETWEEN A MOBILE DEVICE AND A VEHICLE

(71) Applicant: AO Kaspersky Lab, Moscow (RU)

(72) Inventors: Eugene V. Kaspersky, Moscow (RU); Andrey P. Doukhvalov, Moscow (RU); Pavel V. Dyakin, Moscow (RU); Dmitry A. Kulagin, Moscow (RU); Sergey V. Konoplev, Moscow (RU); Anton V. Tikhomirov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 102 days.

This patent is subject to a terminal disclaimer.

(21) Appl. No.: 16/693,636

(22) Filed: Nov. 25, 2019

(65) Prior Publication Data

US 2020/0089219 A1    Mar. 19, 2020

Related U.S. Application Data

(63) Continuation of application No. 16/124,326, filed on Sep. 7, 2018, now Pat. No. 10,545,496, which is a
(Continued)

(30) Foreign Application Priority Data

Dec. 12, 2016   (RU) ............................ RU2016148487

(51) Int. Cl.
*H04W 12/06* (2021.01)
*H04L 29/06* (2006.01)
(Continued)

(52) U.S. Cl.
CPC ............. *H04W 12/06* (2013.01); *B60R 25/01* (2013.01); *B60R 25/24* (2013.01); *B60W 50/08* (2013.01);
(Continued)

(58) Field of Classification Search
CPC ...... H04W 12/06; H04W 12/00; B60R 25/01; B60R 25/24; G05D 1/0016; H04L 29/06;
(Continued)

(56) References Cited

U.S. PATENT DOCUMENTS

2004/0257209 A1   12/2004   Yang
2010/0070106 A1   3/2010    Okamoto et al.
(Continued)

FOREIGN PATENT DOCUMENTS

DE   102014010752 A1   1/2016
RU   2014116263 A      10/2015
WO   2016179907 A1     11/2016

*Primary Examiner* — Tan Q Nguyen
(74) *Attorney, Agent, or Firm* — Arent Fox LLP; Michael Fainberg

(57) ABSTRACT

Disclosed are systems and methods for enabling transmission of data and commands between a mobile device and a vehicle. An exemplary method comprises connecting a security device to a vehicle and to a mobile device, the security device having a protected memory, verifying, by the security device, an authenticity of the mobile device, allowing, by the security device, transmission of data and commands between the mobile device and at least one actuating device of the vehicle when the mobile device is verified as being authentic, transmitting, by the security device, results of executions of commands from the at least one actuating device of the vehicle to the mobile device.

21 Claims, 6 Drawing Sheets

Related U.S. Application Data continuation of application No. 15/670,034, filed on Aug. 7, 2017, now Pat. No. 10,101,738.

(51) Int. Cl.
  *G05D 1/00* (2006.01)
  *H04L 12/40* (2006.01)
  *B60R 25/01* (2013.01)
  *B60R 25/24* (2013.01)
  *H04L 12/403* (2006.01)
  *H04L 67/12* (2022.01)
  *B60W 50/08* (2020.01)

(52) U.S. Cl.
  CPC .......... *G05D 1/0016* (2013.01); *H04L 12/40* (2013.01); *H04L 12/403* (2013.01); *H04L 63/0853* (2013.01); *H04L 67/12* (2013.01); *B60W 2552/00* (2020.02); *B60W 2554/00* (2020.02); *B60W 2555/20* (2020.02); *B60W 2555/60* (2020.02); *B60W 2556/45* (2020.02); *H04L 2012/40273* (2013.01)

(58) Field of Classification Search
  CPC .............. H04L 12/40; B60W 2552/00; B60W 2554/00; B60W 2555/45; B60W 2555/20; B60W 2555/60
  See application file for complete search history.

(56) References Cited

U.S. PATENT DOCUMENTS

| | | |
|---|---|---|
| 2014/0033293 A1* | 1/2014 | Kennedy ............. B60R 25/1001 726/10 |
| 2014/0066039 A1 | 3/2014 | Wang |
| 2014/0309886 A1 | 10/2014 | Ricci |
| 2016/0046294 A1 | 2/2016 | Lee et al. |
| 2016/0099927 A1 | 4/2016 | Seval et al. |
| 2016/0127900 A1 | 5/2016 | Fitzgerald |
| 2016/0170494 A1 | 6/2016 | Bonnet et al. |
| 2016/0200326 A1 | 7/2016 | Cullinane et al. |
| 2016/0272135 A1 | 9/2016 | Kim et al. |
| 2016/0295005 A1 | 10/2016 | Schussmann et al. |
| 2017/0140144 A1* | 5/2017 | Bock .................... G06Q 20/40 |
| 2018/0309760 A1* | 10/2018 | Arasavelli ............ H04L 63/105 |

* cited by examiner

SYSTEMS AND METHODS FOR ENABLING TRANSMISSION OF DATA AND COMMANDS BETWEEN A MOBILE DEVICE AND A VEHICLE

CROSS-REFERENCE TO RELATED APPLICATIONS

The present application is a continuation of U.S. patent application Ser. No. 16/124,326 filed on Sep. 7, 2018, which is a continuation of U.S. patent application Ser. No. 15/670,034 filed on Aug. 7, 2017, which further claims benefit of priority under 35 U.S.C. 119(a)-(d) to a Russian Application No. 2016148487 filed on Dec. 12, 2016, all of which are incorporated by reference herein.

FIELD OF TECHNOLOGY

The present disclosure relates generally to the field of automotive security, and more specifically, to systems and method for secure control of automotive systems using mobile devices.

BACKGROUND

The automotive industry is undergoing rapid development fueled by innovations in the areas of computers, sensors and communications. New computer-based control systems are being deployed in vehicles to make them more efficient, safer and comfortable for drivers. These automotive systems are typically controlled by onboard control units.

For example, in order to comply with various government standards, the automotive control systems optimize working of the engines to ensure a more ecological exhaust without adversely effecting vehicle's power characteristics. For a more adaptive driving, the control systems of the gear boxes are optimized, adapting to the driving style, the road conditions and the weather conditions, by shifting the transmission more smoothly or less often, engaging the rear or front wheels, and changing the time of transfer of force between the wheel axles.

More complicated systems are being universally introduced, such as an automated parking system (based on sensors registering the distance between the vehicle and obstacles), a driving assistant program (such as recognition by a camera of the position of the vehicle in its traffic lane and on the road in general), and an emergency braking system (such as based on detecting obstacles by means of infrared sensors).

The systems of modern vehicles contain various control objects (the immediate mechanical parts of the vehicle, such as the engine or brakes), control units (electronic devices containing algorithms generating control commands), actuating devices (such as relays and simple units able to react to commands from a control unit) and measuring devices (usually sensors, able to transmit data to the control devices as to the state of the control objects).

Often all of the systems of an vehicle (and the electronic devices making up the systems) are connected to a common bus, and they exchange data with each other by means of that bus, which complicates the control algorithms of the vehicle even more.

Manufacturers provide drivers with possibilities of setting up or reconfiguring their vehicles, but often this requires special hardware and software. For example, by using the data bus of the vehicle it is possible to change the parameters of the firmware of the control unit of the vehicle or update the firmware entirely. Also, by connecting to the data bus of the vehicle, a driver himself can use a mobile telephone to view all errors contained in the memory of the control unit and make a decision as to the technical status of the vehicle. Thus, there is a trend toward simplifying the access to the various vehicle systems and there are technologies where a more traditional device for the user (such as a mobile telephone) is connected to the vehicle.

However, with simplified access, problems of security may arise, since hackers have new opportunities for connecting to the vehicle. Furthermore, along with the introduction of new systems, the overall safety of the vehicle declines. The vehicle becomes more complicated, it contains a multitude of control units, often the control units contain various components, and the development of the control algorithms is done by different groups of people in different environments. One cannot rule out mistakes or omissions, as well as various vulnerabilities. Given the fact that the control units are connected to a common data bus, a hacker who is connected to the bus can disable the control units or replace the control algorithms, which greatly decreases the safety of the driver when driving the vehicle.

Therefore, systems for improving the security of vehicle control systems are needed.

SUMMARY

To solve the aforementioned problems, an approach is disclosed herein by which the control systems of an vehicle may be at least partially moved to a mobile device (such as a smartphone), which already has many integrated security mechanisms which can be used for protection of the vehicle control system. In such an approach, the vehicle continues to contain functional systems, but it does not contain control units, which are now moved to the mobile device. When the vehicle is connected to the mobile device, all the systems of the vehicle gain their usual functionality. The connection between the vehicle and the mobile device can be implemented using a security device, which assures a secure transfer of data and commands between the mobile device and the vehicle to which it is connected.

More specifically, the present invention is directed to the systems, methods and computer program products for enabling transmission of data and commands between a mobile device and a vehicle, e.g., for controlling the vehicle via the mobile device.

According to one embodiment, a method is disclosed comprising connecting a security device to a vehicle and to a mobile device, the security device having a protected memory, verifying, by the security device, an authenticity of the mobile device, allowing, by the security device, transmission of data and commands between the mobile device and at least one actuating device of the vehicle when the mobile device is verified as being authentic, transmitting, by the security device, results of executions of commands from the at least one actuating device of the vehicle to the mobile device.

In one aspect, the method further comprises verifying, by the security device, an authenticity of the vehicle.

In one aspect, the method further comprises blocking, by the security device, access to systems of the vehicle when the mobile device is not successfully verified as being authentic, the systems of the vehicle to which access is blocked including at least actuating devices of the vehicle.

In one aspect, the commands for a particular actuating device of the at least one actuating device are generated by a respective separate process or thread that interacts with other processes and generates commands for the particular actuating device.

In one aspect, the results of executions of commands are determined from measurement devices communicatively coupled to the security device.

In one aspect, the commands are formed based on command forming algorithms downloaded to the mobile device from a cloud service, and wherein data used for updating the command forming algorithms is provided to the mobile device when an update is detected for at least one of: traffic rules and driving safety restrictions based on a road, locality or the vehicle.

In one aspect, the security device is removable from the vehicle.

In one aspect, the security device comprises: a protected memory chip placed inside the mobile device and a specialized software that operates with security containers for verification of actions being performed by applications of the mobile device.

In one aspect, a system for enabling transmission of data and commands between a mobile device and a vehicle is provided. The system comprises a protected memory and a hardware processor configured to: connect the security device to a vehicle and to a mobile device, verify an authenticity of the mobile device, allow transmission of data and commands between the mobile device and at least one actuating device of the vehicle when the mobile device is verified as being authentic, and transmit results of executions of commands from the at least one actuating device of the vehicle to the mobile device.

In one aspect, a non-transitory computer-implemented storing instructions thereon for enabling transmission of data and commands between a mobile device and a vehicle is disclosed, the instructions comprising connecting a security device to a vehicle and to a mobile device, the security device having a protected memory, verifying, by the security device, an authenticity of the mobile device, allowing, by the security device, transmission of data and commands between the mobile device and at least one actuating device of the vehicle when the mobile device is verified as being authentic, transmitting, by the security device, results of executions of commands from the at least one actuating device of the vehicle to the mobile device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for enabling transmission of data and commands between a mobile device and a vehicle. It should be noted that the disclosed systems and methods are applicable to all kinds of motorized vehicles (e.g., internal combustion engines, hydrogen engines, electric engines, and others) and containing an electronic controlling device, such as a computer processor or application specific integrated circuit. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
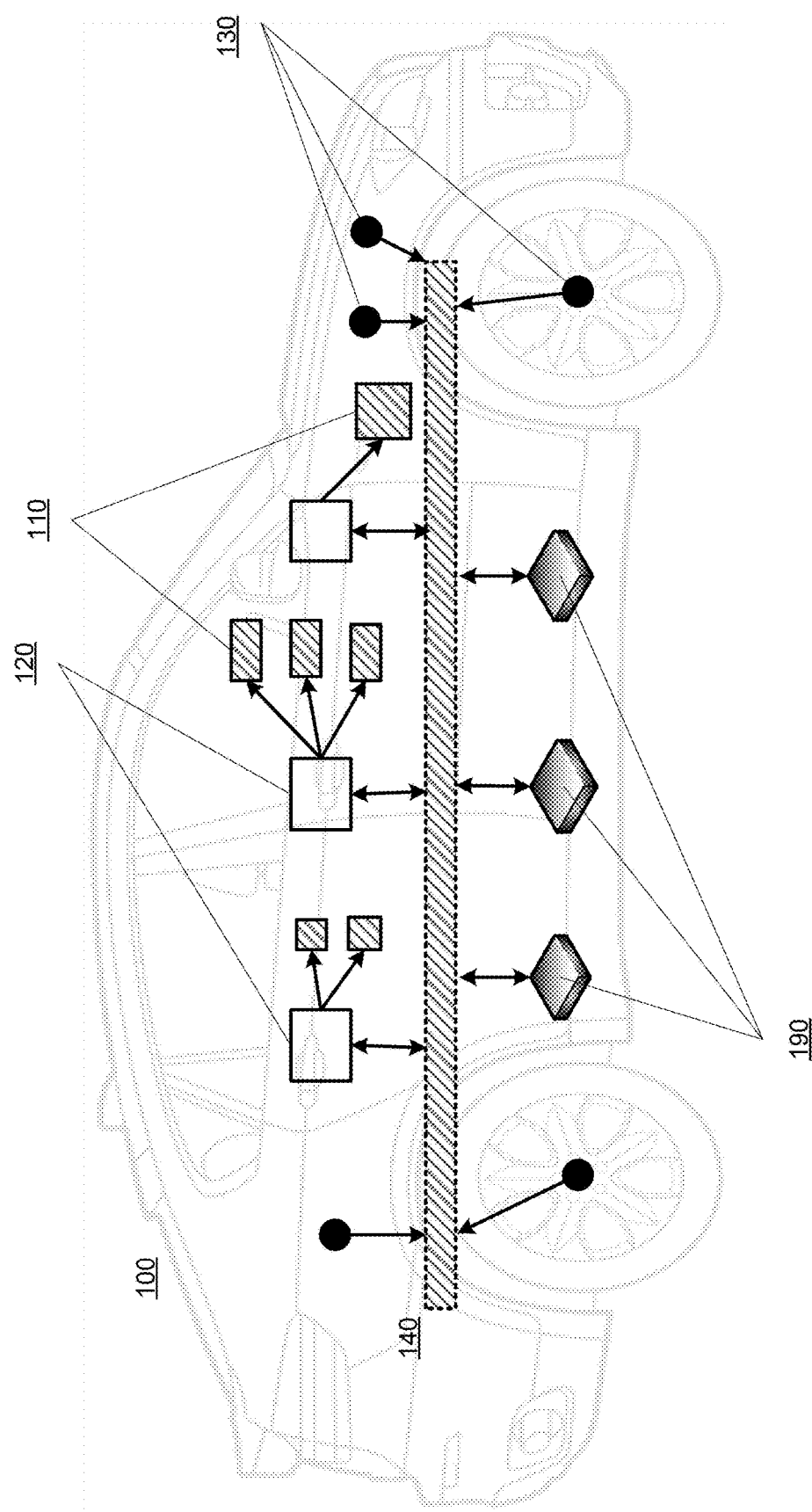
FIG. 1A illustrates an example of configuration of the vehicle control systems.

FIG. 1A illustrates an example of configuration of a vehicle control system. In the general, the vehicle 100 may contain at least one control object 110. Generally, a control object may be a device or a dynamic process, the control of whose behavior is the purpose for creating the automatic control system. Particularly, the control object 110 may be any functional part of the vehicle as a whole, such as: the engine; an electric motor; an automatic or robotized gear box; an anti-lock braking system (ABS); a power steering unit; a hydraulic steering booster; or other vehicle subsystem. In one exemplary aspect, the control object 110 may be part of any functional element of the vehicle, such as: the engine fuel system; the engine ignition system; the gearshift control system; the vehicle stability system; the electric valve for regulating the force on the hydraulic booster pump and/or steering rack (system changing the force on the steering wheel depending on the speed); the inductive element for regulating the force on the electric steering rack; or other elements.

Furthermore, for each control object 110 the vehicle 100 may contain at least one electronic actuating device 120, which transmits an action from an electronic controlling device 190. Generally, an actuating device may be a device of the system of automatic control or regulation that acts on the process in accordance with command information received. The actuating device 120 may include, but not limited to: a relay; a programmable logic integrated circuit (PLIC), programmed to transmit an action to control objects 110 of the same type and not having its own control algorithms; an analog-digital converter (ADC); a digital-analog converter (DAC); or other types of devices.

Furthermore, the vehicle 100 may contain at least one measurement device 130. The measurement device 130 may include, but is not limited to: a sensor for measuring characteristics of the vehicle (such as a sensor of the temperature of coolant fluid, a Hall sensor, etc.); a PLIC, transforming (for example encoding) the type (form, frequency, amplitude) of the sensor signal into another type understandable to the controlling device 190 (for example, the majority of modern sensors of the mass flow rate of air contain an ADC within themselves).

In one exemplary aspect, all of the actuating devices 120 and the measuring devices 130 may be connected to a communication bus 140 (such as a Controller Area Network, or CAN) of the vehicle 100. Alternatively, only some of the actuating devices 120 may be connected to the electronic bus 140 (for example, the sound signal relay is closed by the action of the driver on the steering wheel, bypassing the CAN bus) and only some of the measuring devices 130 are so connected (for example, the sensor for the level of windshield washing liquid is connected directly to the dashboard).

In one example aspect, the actuating device 120 of the vehicle 100 transmits via the bus 140 the result of the execution of a command (for example, when the actuating device 120 is realized as a PLIC).

In one example aspect, the vehicle 100 may also contain one or more controlling devices 190 that track the state of a control object as a system and produces control signals for it. The controlling device 190 may track the change in parameters of the control object directly or through a measurement device, and responds to a change in parameters by means of control algorithms in accordance with the specified control quality. Usually the controlling devices 190 contain control algorithms for the systems of the vehicle and form control commands which they transmit to the actuating devices 120 via the bus 140. Examples of controlling devices 190 include, but not limited to: the electronic control unit (ECU), the control unit of the automatic transmission, the control unit of the anti-lock braking system, the head unit, and other others.

Figure 1B:
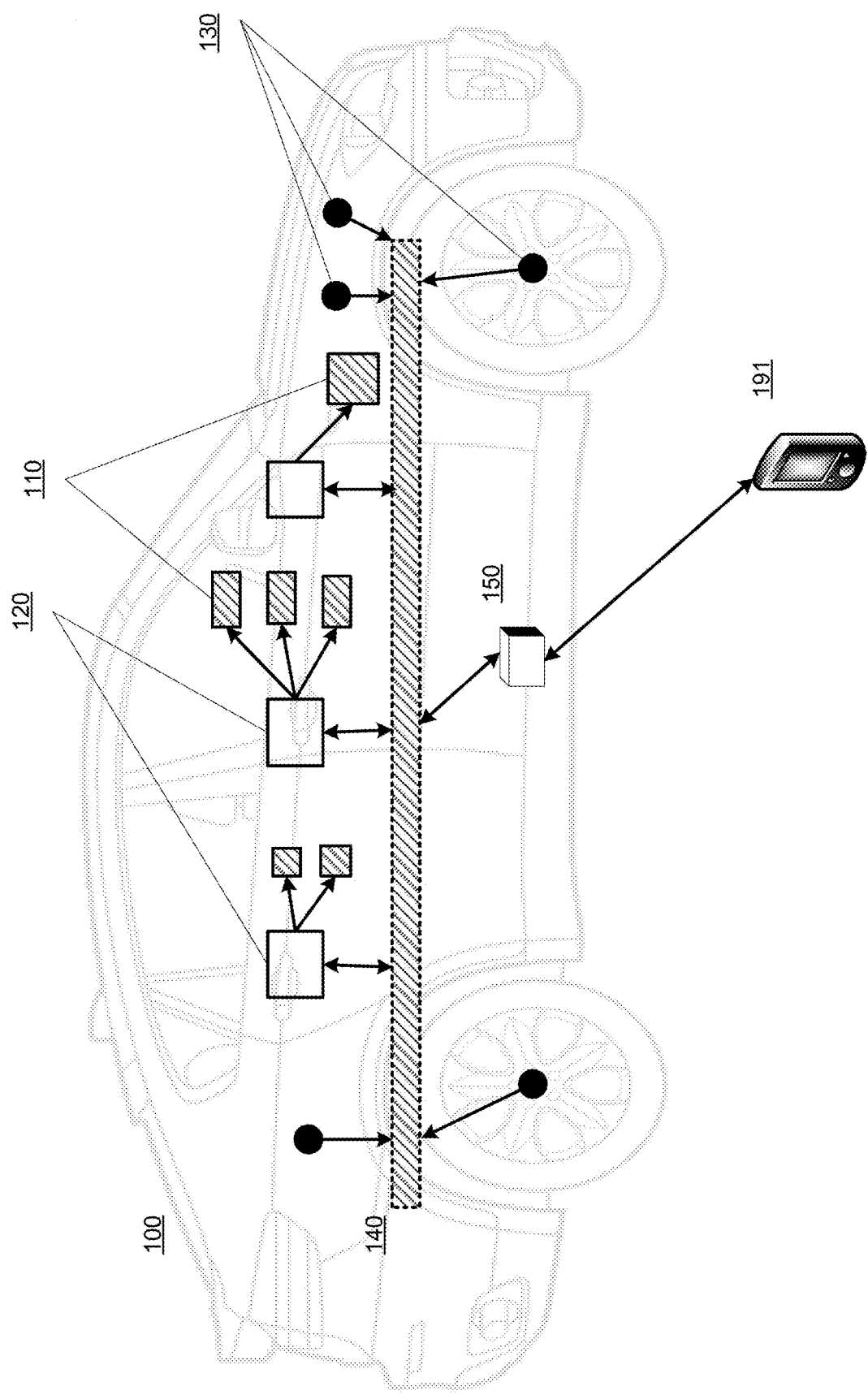
FIG. 1B illustrates an example of the system for secure control of the automotive systems using a mobile device according to one aspect of the invention.

FIG. 1B illustrates an example of the system for secure control of the automotive systems using a mobile device according to one aspect of the invention. The controlling device 190 in the context of the present disclosure may be implemented as a mobile device 191. The mobile device 191 can be a smartphone, a tablet, a smart key, as well as any other type of mobile device. In one example aspect, the mobile device 191 may be a module connected to a general-purpose computer system, such as for example the one depicted in FIG. 3. In yet another exemplary aspect, the mobile device 191 may be a module of a modular device, such as a modular smartphone. In yet another exemplary aspect, the mobile device 191 may be a mobile general-purpose computer system (such as a notebook), depicted in FIG. 3.

In one exemplary aspect, the vehicle 100, acting as a peripheral device, connects via bus 140, to the mobile device 191, which acts as a master device. It is known that the CAN bus for data transmission uses frames or blocks of data of given structure. This allows the mobile device 191 to act as a controlling device, to receive data from the measurement devices 130 of the vehicle 100 and send the controlling commands to the actuating devices 120 of the vehicle 100. Data and commands may be transmitted in blocks on the bus 140. The mobile device 191 may be connected to bus 140 either, wirelessly, via e.g., a Bluetooth connection, or via a wireline connection, such as a USB interface, or any other wired or wireless interface.

In one exemplary aspect, the mobile device 191 may contain at least one algorithm of forming control commands for at least one actuating device 120 of the vehicle 100. In this implementation, the vehicle 100 may not need to contain any control device 190. The mobile device 191 formulates commands using algorithms of forming control commands for control of the actuating device 120 based on data received from at least one measurement device 130.

In one exemplary aspect, the mobile device 191 contains algorithm of forming control commands for all the actuating devices 120 of the vehicle 100. The mobile device 191 may control (form control commands) all of the actuating devices 120 of the vehicle 100, in which case, the vehicle 100 may not need to contain any control devices 190. In one exemplary aspect, the mobile device 191 does not transmit control commands to the other control devices 190, but instead transmits them to the actuating devices 120 of the vehicle 100.

In one exemplary aspect, the connection of the vehicle 100 to the mobile device 191 may be done via a security device 150. In this case, the vehicle 100 is connected to the security device 150 by means of the bus 140, and the security device 150 is connected to the mobile device 191. An example of such security device is a printed circuit board having an output to the bus 140 and a socket for connection to a mobile device 191. The printed circuit board may house a processor and a protected (e.g., read-only) memory for verifying the authenticity of the mobile device 191 and (optionally) the vehicle 100 by means of the bus 140. In one aspect, the security device 150 can also be removed from the vehicle 100 (disconnected from the bus 140). In another aspect, the security device 150 may be located inside (is part of) the mobile device 191. An example of such security device is a protected chip placed inside the mobile device 191 and a special software working with security containers (such as those of the KNOX technology) for verification of actions being performed on the part of applications of the mobile device 191. Another example of such security device is a hypervisor on the mobile device 191, which enables the use of two operating systems: one operating system executes functions of the mobile device 191, the other one works in real time (real-time operating system, RTOS) and executes the control of the vehicle 100.

Figure 1C:
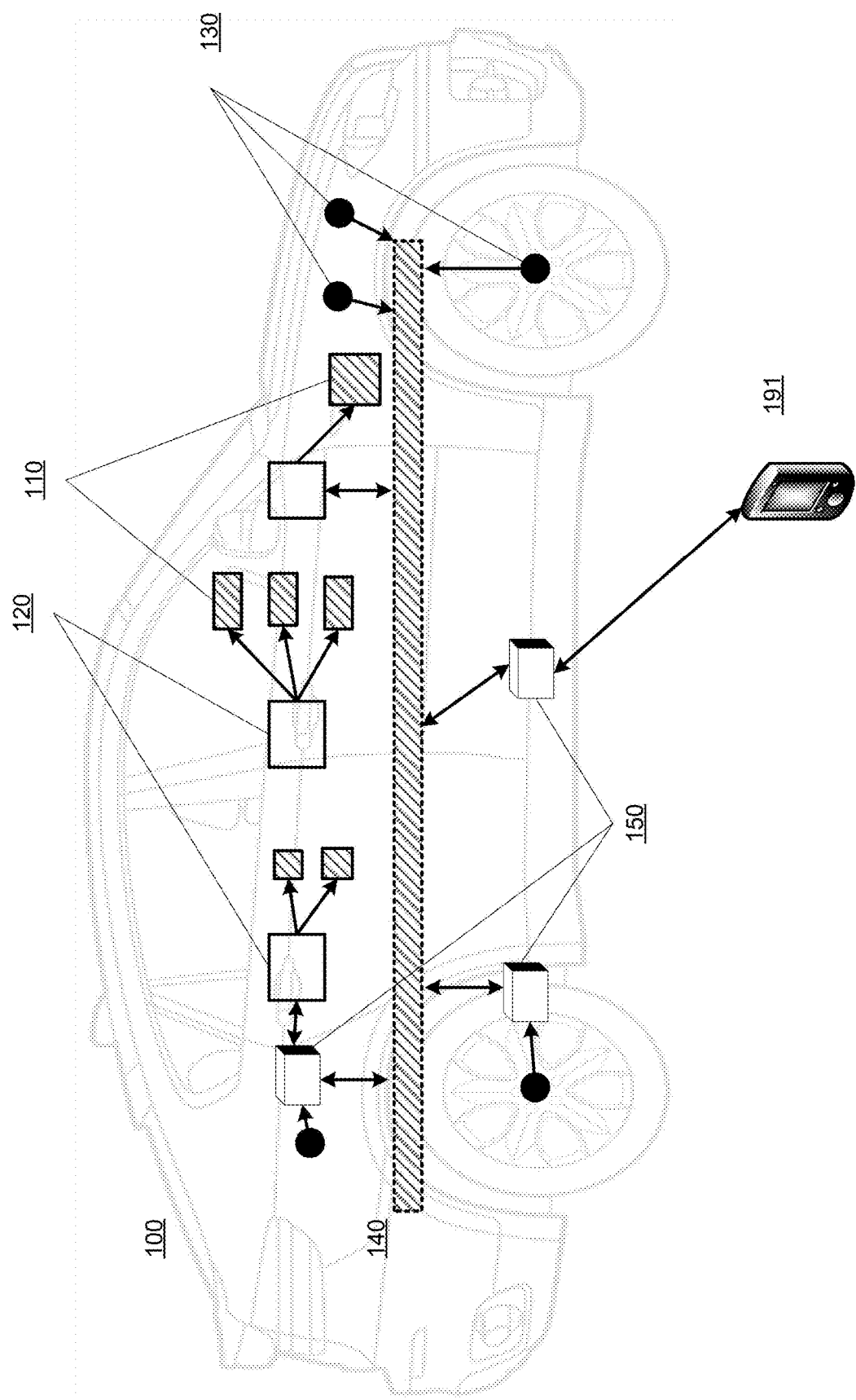
FIG. 1C illustrates an example of the system for secure control of the automotive systems using a mobile device according to another aspect of the invention.

FIG. 1C illustrates an example of the system for secure control of the automotive systems using a mobile device according to another aspect of the invention. In this implementation, the security device 150 may be located together with at least one actuating device 120. For example, inside the actuating device 120 or in series with one or more actuating devices 120, so that the actuating device 120 is connected to the bus 140 of the vehicle 100 by means of the security device 150. In one aspect, the security device may be placed together with all the actuating devices 120 of the vehicle 100. In another aspect, the security device 150 may be placed together with at least one measurement device 130. In yet another aspect, the security device 150 may be placed together with all measurement devices 130 of the vehicle 100. An example of this implementation may be when a controller is situated in the actuating devices 120 and measurement devices 130 and utilizing a protected chip containing a set of enabled policies, settings and parameter values.

In the general case, the security device 150 provides secure transmission of data from the measurement device 130 of the vehicle 100 to the mobile device 191 and a secure transmission of commands from the mobile device 191 to the actuating device 120 of the vehicle 100. The secure transmission, in the context of the present disclosure, assures that the data sent by the measurement device 130 to the mobile device 191, and the command sent from the mobile device 191 to the actuating device 120, will be delivered in unaltered and unsubstituted form. That is, they will not be altered or modified by hackers or third party devices connected to the bus 140 of the vehicle 100. In one exemplary aspect, the security device 150 may use synchronous or asynchronous methods of data encryption.

In one exemplary aspect, the security device 150 can be realized either by software or by hardware, and by a software and hardware complex. In one exemplary aspect, the security device 150 may be realized in the "black box" principle, that is, in the form of a device having inputs and outputs, but with data processing methods hidden from third parties.

In one exemplary aspect, the security device 150 may perform authenticity verification of the mobile device 191 connected to the bus 140 of the vehicle 100. This verification may be done using pairs of authentication keys and known encryption methods. In the event it is confirmed that an authorized device 191 is connected to the bus 140 of the vehicle 100, the security device 150 will allow transmission of data and commands to/from the mobile device 191. Particularly, the security device 150 allows authorized mobile device 191 to transmit control commands to the actuating device 120 of the vehicle 100, and the security device 150 transmits the result of the execution of the command from the actuating device 120 of the vehicle 100 to the authorized mobile device 191. Also, if the authenticity of the mobile device is confirmed, the security device 150 may no longer take part (it is disconnected or does not perform the encryption/decryption functions) in the working of the system until the next authenticity check. However, if the security device 150 detects that an unknown/unauthorized mobile device 191 is connected to the vehicle 100, the security device 150 may blocks access of an unauthorized mobile device 191 to the systems of the vehicle 100.

In one exemplary aspect, several different vehicles 100 may be connected, as peripheral devices, to the mobile device 191, the vehicles 100 can be connected to the mobile device 191 either simultaneously or alternately (only one vehicle 100 is connected in a separate time interval). An example of a simultaneous connection is a case where, for example, several vehicles 100 have arrived on a truck, and a single mobile device 191 is used to control their unloading from the truck (for example, commands are sent alternately or at once to all the vehicles 100 from the mobile device 191). An example of alternating connection is a case where one spouse in a family has a one mobile device 191 and another spouse has a second mobile device 191 and the family has three vehicles 100. In one exemplary aspect, the vehicle 100 will be connected to the mobile device 191 (for example, the vehicle 100 is a peripheral device to the mobile device 191), that is, a repeated connecting of the vehicle 100 to the mobile device 191 will occur automatically.

Figure 1D:
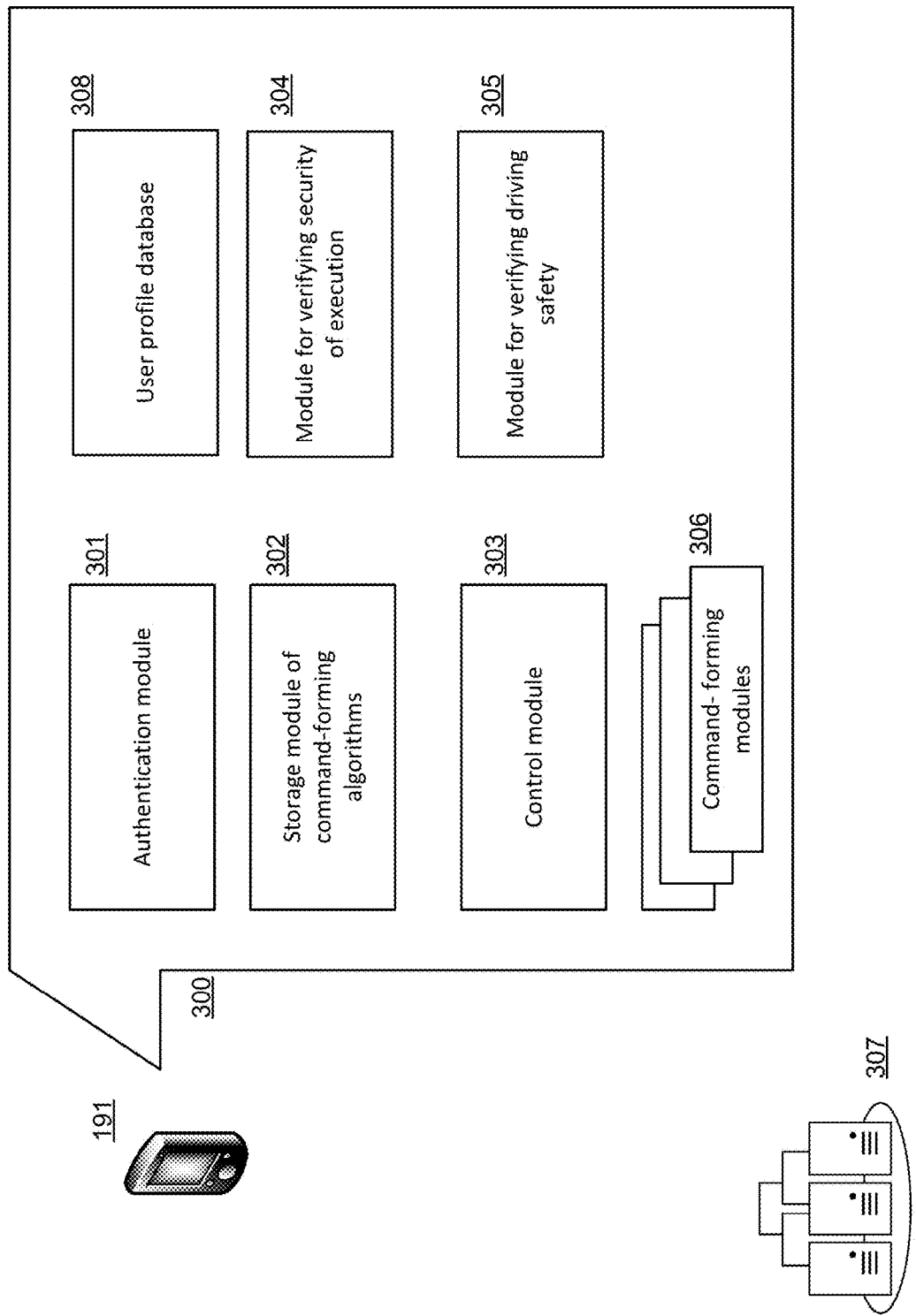
FIG. 1D illustrates an example of configuration of the system for secure control of the automotive systems using a mobile device according to one aspect of the invention.

FIG. 1D illustrates an example of configuration of the system for secure control of the automotive systems using a mobile device according to one aspect of the invention. The depicted system may be implemented in a mobile device 191. The control system may be implemented as a mobile application 300 stored in the memory of the mobile device 191 and executable by the processor of the mobile device 191. The mobile application may include, but not limited to:
an authentication module 301, a storage module for the command-forming algorithms 302, a controlling module 303, a module verifying security of execution 304, a module verifying safety of control commands 305 and one or more command forming modules 306. These modules may work under the control of a single real-time operating system of the mobile device 191, such as Android OS, Apple iOS, Windows Mobile OS or other mobile OS.

When the mobile application 300 is launched on the mobile device 191, it may first active the authentication module 301, which may optionally perform authentication of a user of the mobile device 191 (i.e., vehicle operator/driver). The user authentication may be performed using one or more of a pin, password, facial recognition, voice recognition, fingerprint recognition or other single- or multi-factor authentication techniques. Once the user is authenticated, the mobile application 300 may access the user profile database 308 which contains information about the user and various user preferences. For example, the information about the user may include user's age, gender, health conditions that may impact user's driving abilities (e.g., visual impairment, limited range of motion, physical disability, medications, etc.) and other information used by the application to optimize user's driving experience. The information about user preferences may include position/incline of the seat, position of the driving wheel, position of the side view and rearview mirrors, favorite radio station, favorite destinations, driving mode (e.g. comport, sport, off-road), etc. The information contained in the use profile database 308 may be used by the command forming algorithms to configure various automotive systems of the vehicle 100 to user preferences and needs.

Once the user is authenticated, the security device 150 of the vehicle 100 connects to the mobile device 191 either wirelessly (e.g., a Bluetooth connection), via a wireline connection (e.g., a USB interface), or other means, and the authentication module 301 automatically performs authentication of the mobile device 191 with the security device 150 of the vehicle 100. As described above, the authentication of the mobile device 191 may be done, for example, using a pair of private/public keys and known cryptographic algorithms.

In one exemplary aspect, the storage module of command-forming algorithms 302 contains a plurality of algorithms of forming of commands for control of the actuating devices 120 of the vehicle 100 (such as the engine, transmission, suspension, steering wheel, seats, rearview and side view mirrors, etc.). In another exemplary aspect, the storage module of command-forming algorithms 302 also contains a plurality of algorithms of forming commands for various electronic systems of the vehicle 100 (such as audio system, navigation system, climate control system, etc.). An example of a command-forming algorithm is an algorithm for control of the automatic transmission of the vehicle. Depending on the engine speed and the position of the gas pedal, the algorithm decides when to shift the gear to higher one. So, for example, with smooth acceleration (the gas pedal is depressed by 30%), the next gear can be turned on 4000 turns of the crankshaft, with a sudden acceleration (the gas pedal is pressed 70%)—the next gear should be turned on 5000 turns of the crankshaft. Such command-forming algorithms can be downloaded to the mobile device 191 from a cloud service 307. The command forming algorithms may be specific to the given vehicle 100, general for different types of vehicles, and specific to the user (e.g., elderly driver).

In one exemplary aspect, the user may change/customize change some of the algorithms of forming of commands based on user profile information to the extent specified by the module for verifying driving safety 305. Particularly, the module 305 contains rules for verifying various parameters of the operation of the vehicle based on user profile information (e.g., user personal information and/or preference) and based on various driving restrictions, such as local speed limit, local traffic rules, road condition, weather condition, traffic condition or other driving safety restrictions that should be imposed on the vehicle 100.

In one exemplary aspect, the controlling module 303 controls the individual actuating device 120 by creating (initiating) an individual command forming module 306 for each controlled actuating device 120. In one exemplary aspect, the module 306 may be a process within the real-time operating system of the mobile device 191. For example, for each actuating device 120, the controlling module 303 may start, for example, in a real time, a separate process or thread that will interact with other processes and generate commands for the actuator 120. Depending on the criticality of the actuating device 120 (i.e., the braking system or car audio system have different effects on safety), control processes can work on different OS layers with different privileges. Furthermore, in one exemplary aspect, all modules 306 may be separated from each other at the level of the operating system, which prevents attacks involving the insertion of malicious code into their respective address space.

In one exemplary aspect, the module for verifying security of execution 304 tracks all data going to the modules 306 and the commands formed by the modules 306, in order to verify the integrity of the data. For example, the module 304 may apply limitations on command values (for example, the motor temperature sensor is interrogated continuously, the normal value cannot differ from the previous one by more than 10 units). In one exemplary aspect, module 304 may provide integrity of data by several known approaches For example, module 304 may use digital signature for data packets when they are transmitted. A digital signature can be issued or updated with a cloud service 307. A digital signature ensures that the data has not been damaged or altered during transmission In another example, module 304 may secure access to data by determining which module 306 can transmit which types of data. For example, the engine temperature can only be transmitted by a suitable sensor. Other sensors should not have the rights to form packets with such information. Also, this approach guarantees the reliability of data In yet another example, module 304 may also provide confidentiality of data by encrypting communication channels (for example, inside bus 140) and installing p2p connections.

In one exemplary aspect, the cloud service 307 can update the data of the modules 302 and of the modules 305 (for example, after updating the traffic rules or driving safety restrictions for a specific road/locality/vehicle 100).

Figure 2:
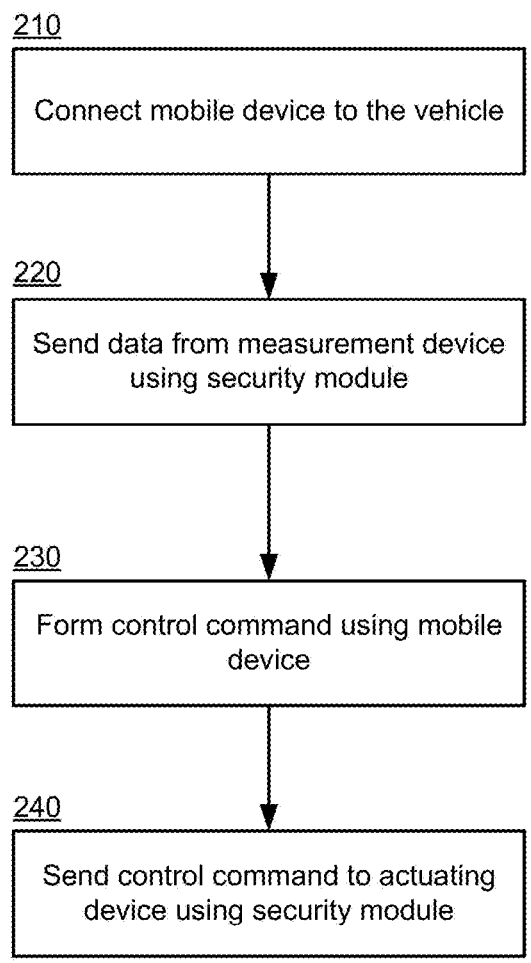
FIG. 2 illustrates an example of the method for secure control of the automotive systems using a mobile device according to one aspect of the invention.

FIG. 2 illustrates an example of the method for secure control of the automotive systems using a mobile device according to one aspect of the invention. At step 210, the security device 150 connects the vehicle 100, containing control objects 110, actuating devices 120 and measurement devices 130, to the mobile device 191. In the general case, the actuating device 120 may be an electronic actuating device, while the measurement device 130 is an electronic measurement device. In one exemplary aspect, all of the actuating devices 120 and all of the measurement devices 130 are connected to the bus 140 of the vehicle 100. In another exemplary aspect, only some of the actuating devices 120 and some of the measurement devices 130 are connected to the bus 140 of the vehicle 100.

In one exemplary aspect, the vehicle 100 is connected to the security device 150 by the bus 140, and the security device 150 is connected to the mobile device 191.

At step 220, the security device 150 performs a secure transmission of data from the mentioned measurement device 130 to the mobile device 191. In the general case, data from the measurement devices 130 is transmitted by blocks on the bus 140 of the vehicle 100.

At step 230, on the basis of the data received, the aforementioned algorithms of forming control commands is used to form, with the help of the mobile device 191, a control command for at least one actuating device 130. In one example aspect, the command is a block of data transmitted on the bus 140 of the vehicle 100. Also, at this step, the formed control commands may be verified for safety compliance, e.g., speed limit will not be exceed by the vehicle, an authorized driver is in the driver's seat (not an underage driver), nighttime driving conditions are met (i.e., headlights are on), satisfactory weather conditions, satisfactory traffic conditions or other driving safety restrictions are not violated.

At step 240, the security device 150 performs a secure transmission of the formulated control command from the mobile device 191 to the actuating device 120.

An example of the operation of the system for secure control of the automotive systems using a mobile device is provided next. The driver connects the vehicle 100 to the mobile device 191 using the security device 150 via a wireless interface (e.g., Bluetooth connection). The engine of the vehicle 100 is off, being a gasoline engine. The driver presses the button for opening the door on the mobile device 191. The mobile device 191 forms a command for the actuating device 120 (for example, a door lock relay) and sends it, the security device 150 sends the command to the bus 140 of the vehicle 100, the actuating device 120 executes the command (the relay is closed), the control object 110 in turn also responds (the door lock opens). Next, the driver gets into the vehicle 100, connects the vehicle 100 to the mobile device 191 using the security device 150 via a wired interface (e.g., USB port), the mobile device 191 dispatches commands for diagnostics of the control objects 110 of the vehicle 100 and receives in response data as to the diagnostics from the measurement devices 130 and actuating devices 120. After this, the driver presses "Engine Start" button. From the data of the crankshaft sensor (measurement device 130) the mobile device 191 determines that the engine (control object 110) is off (for example, there is no revolution of the shaft within one second), and forms a command for the starter relay (actuating device 120). The starter relay closes, the starter (control object 110) begins to turn over. Together with the starter, the engine crankshaft of the vehicle 100 also begins to turn. The mobile device 191 on the basis of data from the measurement devices 130 (such as the crankshaft sensor and the distribution shaft sensor) forms commands for the actuating devices 120 of the ignition system (e.g., a pulse going to the ignition coil) and fuel supply system (a pulse going to the fuel injector). This sequence is repeated at each revolution of the engine until the engine turns over. The further control of the control objects 110 with the use of commands for the actuating devices 120 of the vehicle 100 is done by the mobile device 191 in a manner similar to that described above.

Figure 3:
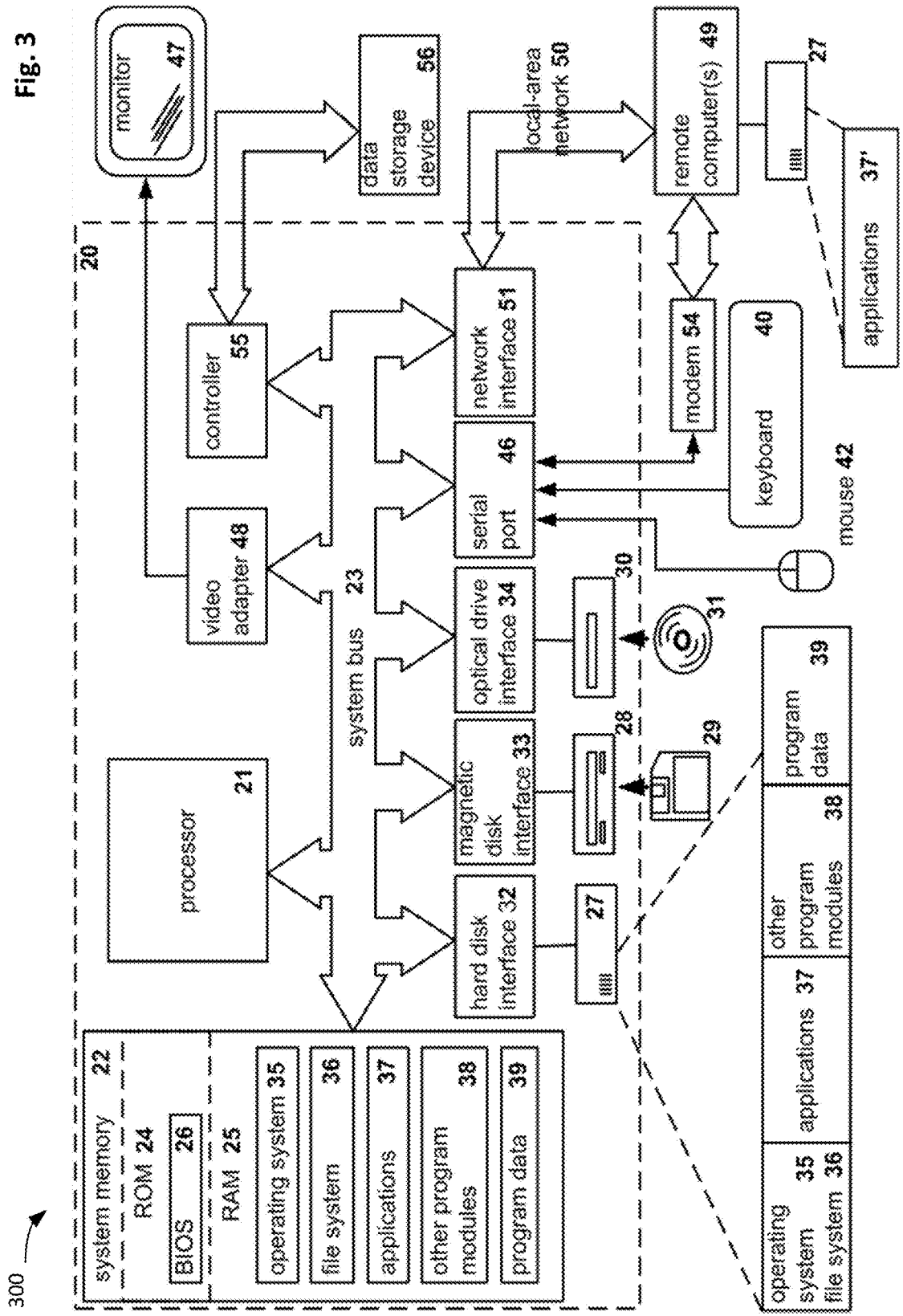
FIG. 3 illustrates an example of a general-purpose computer system enabling the implementation of disclosed systems and methods for secure control of automotive systems.

FIG. 3 is a diagram illustrating an example computer system on which aspects of systems and methods for secure control of the automotive systems using a mobile device may be implemented in accordance with an exemplary aspect of the invention.

As shown, the computer system 20 (which may be a mobile device 191) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, as well as those based on neuromorphic chips (neurosynaptic chips), which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for enabling transmission of data and commands between a mobile device and a vehicle, the method comprising:
   connecting a security device to a vehicle and to a mobile device, the security device having a protected memory;
   verifying, by the security device, an authenticity of the mobile device;
   verifying, by the security device, an authenticity of the vehicle;
   allowing, by the security device, transmission of data and commands between the mobile device and at least one actuating device of the vehicle when the mobile device and the vehicle are verified as being authentic; and
   transmitting, by the security device, results of executions of commands from the at least one actuating device of the vehicle to the mobile device.

2. The method of claim 1, further comprising:
   blocking, by the security device, access to systems of the vehicle when the mobile device is not successfully verified as being authentic, the systems of the vehicle to which access is blocked including at least actuating devices of the vehicle.

3. The method of claim 1, wherein commands for a particular actuating device of the at least one actuating device are generated by a respective separate process or thread that interacts with other processes and generates commands for the particular actuating device.

4. The method of claim 1, wherein the results of executions of commands are determined from measurement devices communicatively coupled to the security device.

5. The method of claim 1, wherein the commands are formed based on command forming algorithms downloaded to the mobile device from a cloud service, and wherein data used for updating the command forming algorithms is provided to the mobile device when an update is detected for at least one of: traffic rules and driving safety restrictions based on a road, locality or the vehicle.

6. The method of claim 1, wherein the security device is removable from the vehicle.

7. The method of claim 1, wherein the security device comprises: a protected memory chip placed inside the mobile device and a specialized software that operates with security containers for verification of actions being performed by applications of the mobile device.

8. A security device for enabling transmission of data and commands between a mobile device and a vehicle, the security device comprising:
   a protected memory; and
   a hardware processor configured to:
      connect the security device to a vehicle and to a mobile device;
      verify an authenticity of the mobile device;
      verify an authenticity of the vehicle;
      allow transmission of data and commands between the mobile device and at least one actuating device of the vehicle when the mobile device is verified as being authentic; and
      transmit results of executions of commands from the at least one actuating device of the vehicle to the mobile device.

9. The security device of claim 8, wherein the processor is further configured to:
   block access to systems of the vehicle when the mobile device is not successfully verified as being authentic, the systems of the vehicle to which access is blocked including at least actuating devices of the vehicle.

10. The security device of claim 8, wherein commands for a particular actuating device of the at least one actuating device are generated by a respective separate process or thread that interacts with other processes and generates commands for the particular actuating device.

11. The security device of claim 8, wherein the results of executions of commands are determined from measurement devices communicatively coupled to the security device.

12. The security device of claim 8, wherein the commands are formed based on command forming algorithms downloaded to the mobile device from a cloud service, and wherein data used for updating the command forming algorithms is provided to the mobile device when an update is detected for at least one of: traffic rules and driving safety restrictions based on a road, locality or the vehicle.

13. The security device of claim 8, wherein the security device is removable from the vehicle.

14. The security device of claim 8, wherein the security device comprises: a protected memory chip placed inside the mobile device and a specialized software that operates with security containers for verification of actions being performed by applications of the mobile device.

15. A non-transitory computer-readable medium storing instructions thereon for enabling transmission of data and commands between a mobile device and a vehicle, including instructions for:
   connecting a security device to a vehicle and to a mobile device, the security device having a protected memory;
   verifying, by the security device, an authenticity of the mobile device;
   verifying, by the security device, an authenticity of the vehicle;
   allowing, by the security device, transmission of data and commands between the mobile device and at least one actuating device of the vehicle when the mobile device is verified as being authentic; and
   transmitting, by the security device, results of executions of commands from the at least one actuating device of the vehicle to the mobile device.

16. The non-transitory computer-readable medium of claim 15, the instruction further comprising instructions for:
   blocking, by the security device, access to systems of the vehicle when the mobile device is not successfully verified as being authentic, the systems of the vehicle to which access is blocked including at least actuating devices of the vehicle.

17. The non-transitory computer-readable medium of claim 15, wherein commands for a particular actuating device of the at least one actuating device are generated by a respective separate process or thread that interacts with other processes and generates commands for the particular actuating device.

18. The non-transitory computer-readable medium of claim 15, wherein the results of executions of commands are determined from measurement devices communicatively coupled to the security device.

19. The non-transitory computer-readable medium of claim 15, wherein the commands are formed based on command forming algorithms downloaded to the mobile device from a cloud service, and wherein data used for updating the command forming algorithms is provided to the mobile device when an update is detected for at least one of: traffic rules and driving safety restrictions based on a road, locality or the vehicle.

20. The non-transitory computer-readable medium of claim 15, wherein the security device is removable from the vehicle.

21. The non-transitory computer-readable medium of claim 15, wherein the security device comprises: a protected memory chip placed inside the mobile device and a specialized software that operates with security containers for verification of actions being performed by applications of the mobile device.

\* \* \* \* \*